United States Patent
Hildebrant

[15] 3,662,216
[45] May 9, 1972

[54] ALTERNATING CURRENT POWER MODULATOR WITH PARALLEL LC CIRCUIT CONTROLLING THE RELATIVE PHASE OF VOLTAGE AND CURRENT APPLIED TO SWITCHING MEANS

[72] Inventor: Andy M. Hildebrant, San Jose, Calif.
[73] Assignee: General Electric, Utica, N.Y.
[22] Filed: June 18, 1970
[21] Appl. No.: 47,307

[52] U.S. Cl.............................315/205, 315/284, 315/307, 323/17, 323/19, 323/24
[51] Int. Cl..........................................................G05f 1/38
[58] Field of Search .............307/252 UA; 321/25; 315/205, 315/251, 253, 258, 283, 284, 297, 307; 323/16, 17, 19, 22 SC, 24, 66, 82

[56] References Cited
UNITED STATES PATENTS

| | | | |
|---|---|---|---|
| 3,422,309 | 1/1969 | Spira et al. | 323/24 UX |
| 3,222,592 | 12/1965 | Kellogg | 323/22 SC |
| 3,438,023 | 4/1969 | Apitz | 323/24 UX |
| 3,363,143 | 1/1968 | Cavanaugh | 323/24 UX |

Primary Examiner—A. D. Pellinen
Attorney—Irving M. Freedman, Robert P. Cogan, Frank L. Neuhauser, Oscar B. Waddell and Joseph B. Forman

[57] ABSTRACT

A gated, bilateral switch is coupled between a resonant power supply and an alternating current load. A detuned, parallel-connected LC circuit is connected across the switch to control the phase difference between current and voltage applied to the switch and assure commutation. In the absence of triggering signals applied to the switch, the LC current provides a first, low level of energy to the load. A zero-voltage crossover at the alternating switch gates the switch at the beginning of alternate half cycles. Power is modulated in response to a logic circuit which alternately enables and disables the zero-voltage crossover switch at a selectable frequency and a selectable duty cycle.

18 Claims, 4 Drawing Figures

PATENTED MAY 9 1972
3,662,216
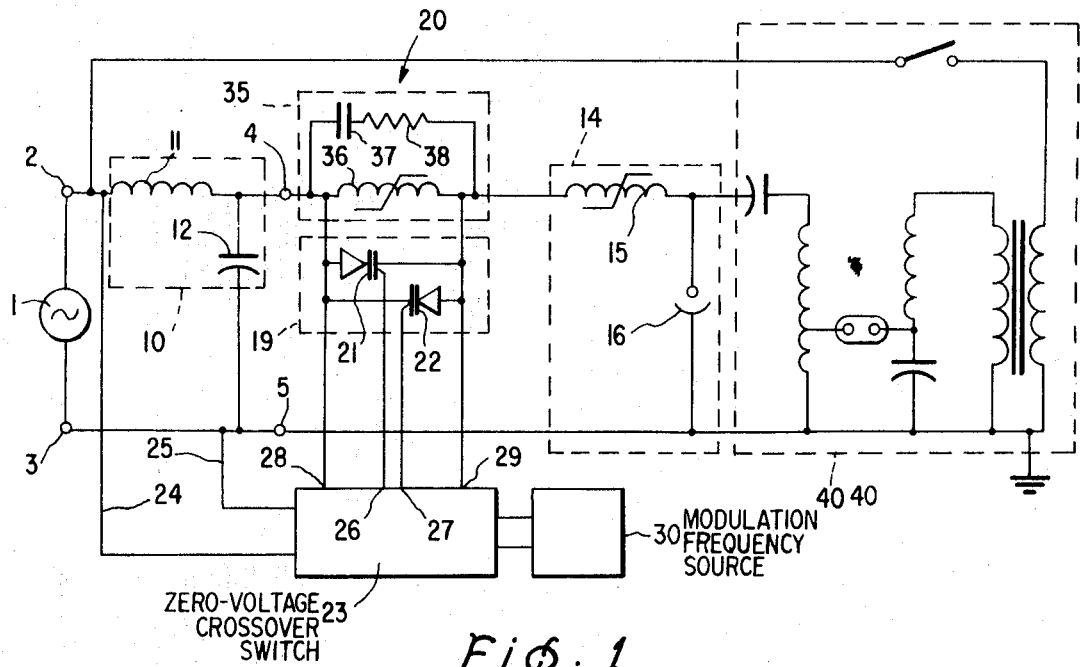
Fig. 1
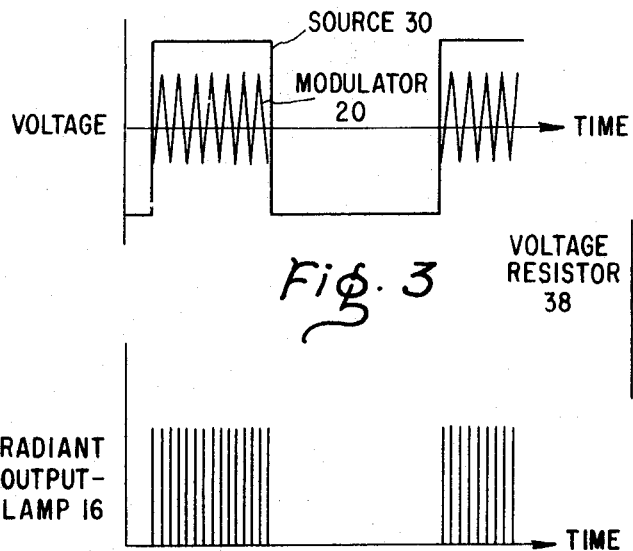
Fig. 3
Fig. 4
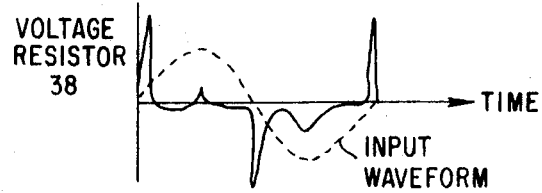
Fig. 2
Inventor
Andy M. Hildebrant
by Robert P. Cagan
His Agent

ALTERNATING CURRENT POWER MODULATOR WITH PARALLEL LC CIRCUIT CONTROLLING THE RELATIVE PHASE OF VOLTAGE AND CURRENT APPLIED TO SWITCHING MEANS

BACKGROUND OF THE INVENTION

This invention relates to electrical transmission systems and more particularly to modulation of alternating current power into a load. The invention described herein was made in the course of or under a contract or subcontract thereunder, with the United States Department of the Air Force.

While systems for modulating power into a linear load are well known, systems for modulating alternating current power into a load have not been provided in the past. A commonly used non-linear load is the discharge lamp, for example, a xenon lamp. Such lamps are operated by providing thereto high-energy pulses in excess of the lamp's static breakdown to ionize the gas in the lamp and produce a flash. In the past, systems have not been provided capable of producing bursts of light, i.e. discrete groups of light pulses, each group having a specific duration. Alternating current systems with resonant power supplies have been provided to create a light flash at twice the fundamental frequency of a source. In such a system, an inductor is connected in series with the source and a capacitor is connected across the inductor and source. The inductor and capacitor form a resonant power input circuit. A saturable reactor and a discharge lamp are connected in series with the input resonant circuit. At the beginning of an input half cycle, the capacitor charges. At some time after the input half cycle reaches its peak, and the capacitor is charged, the saturable reactor is saturated by some convenient means so that the charged capacitor is effectively connected across the discharge lamp. The capacitor discharges through the lamp and a flash is produced. The capacitor discharges, the saturable reactor comes out of the saturated state, and the same operation is repeated during the next half cycle. Such a system provides lamp flashes in response to both peaks of the input alternating current voltage. The systems are not capable of variably controlled power operation. Such operation may be provided by modulating alternating current power into the non-linear load.

SUMMARY OF THE INVENTION

It is therefore an object of the invention to provide an alternating current power modulator for a linear or non-linear load.

It is a more specific object of the present invention to provide a system including gated, bilateral switching means connected between an LC input circuit and a load in which the switching means are enabled at a selectable frequency and a selectable duty cycle to provide intervals during which input waves are supplied from alternating current voltage source to the load.

It is a particular object of the present invention to provide a system of the type described including a non-linear load comprising a discharge lamp and capable of producing bursts of light having independently selectable frequency and duration.

It is also an object of the present invention to provide in a system of the type described a parallel LC resonant circuit connected across the switching means to provide an ambient power level to the non-linear load when the switching means are not enabled.

It is a further object of the present invention to provide in a system of the type described an LC circuit connected across the switching means which assures a proper phase relationship of voltage and current for commutation of the switching means.

Briefly stated in accordance with the present invention there is provided a system including an LC input circuit for connection to a source of alternating current voltage which energizes an alternating current load. A modulator circuit including gated, bilateral switching means and a parallel LC tuned circuit connected across the switching means is connected between the LC input circuit and the load. A gating means is provided for gating the switching means during successive source half cycles. The gating means is enabled and disabled by a logic circuit providing output signals at a selectable frequency and duty cycle.

DESCRIPTION OF THE DRAWINGS

The circuitry through which the foregoing objects and features of novelty of the present invention are achieved is pointed out with particularity in the claims forming the concluding portion of the specification. The invention, both as to its organization and manner of operation, as well as additional advantages attained through its employment, maybe further understood by reference to the following drawings taken in connection with the following description.

Of the Drawings:

FIG. 1 is a schematic representation of a system constructed in accordance with the present invention; and FIGS. 2–4 are waveform charts useful in understanding the operation of the present invention.

DESCRIPTION OF THE PREFERRED EMBODIMENT

FIG. 1 is illustrative of a discharge lamp flashing system constructed in accordance with the present invention. An alternating current source 1 providing a source input waveform is connected across input terminals 2 and 3. An LC input circuit 10 is connected across the input terminals 2 and 3 and has output terminals 4 and 5. The input LC circuit 10 includes an inductor 11 connected between the terminals 2 and 4 and a capacitor bank 12 connected between the terminals 4 and 5. The capacitor bank 12 is represented as a single capacitor for simplicity in the drawing, but in practice would comprise a bank of capacitors connected in parallel.

A load 14, which in the present embodiment comprises a saturable reactor 15 and a series-connected discharge lamp 16, is coupled in series between the terminals 4 and 5. The saturable reactor 15 will hereinafter be referred to as the load reactor 15.

A modulator circuit 20 is provided including gated, bilateral switching means 19. The switching means 19 of the present embodiment comprises a pair of oppositely poled and parallel connected thyristors 21 and 22 connected in series between the terminal 4 and the load reactor 15. The thyristors 21 and 22 preferably comprise amplifying gate silicon controlled rectifiers. The amplifying gate silicon controlled rectifier is a well known device, a description of which is found in Seminar Note 671.15 *The Amplifying Gate SCR*, published by the General Electric Company, Schenectady, New York. Gating signals for the SCRs 21 and 22 are provided by a gating means comprising a zero-voltage crossover switch 23 having reference lines 24 and 25 connected to the terminals 2 and 3 respectively. The zero-voltage crossover switch further comprises terminals 26 and 27 respectively coupled to the gates of the SCRs 21 and 22 and reference terminals 28 and 29 respectively coupled to the opposite ends of the parallel combination of the SCRs 21 and 22. A source of modulation frequency comprising a square wave oscillator 30 producing a selectable frequency and selectable asymmetrical waveform, i.e. selectable duty cycle of positive output, is also coupled to the zero-voltage crossover switch 23. The zero-voltage crossover switch 23 is a conventional switching circuit for providing gating signals to the SCRs 21 and 22 when the input voltage across the terminals 2 and 3 crosses the zero level and provides signals when inputs of one polarity are provided from the oscillator 30.

A parallel LC circuit 35 is connected across the parallel combination of the SCRs 21 and 22, also in series between the terminal 4 and the load reactor 15. The parallel LC circuit 35 includes a reactor 36, which may be saturable, connected in series between the terminal 4 and the load reactor 15, and includes a capacitor 37 and a non-inductive resistor 38 both connected in series across the saturable reactor 36.

A conventional starting circuit 40 may be provided including an input winding coupled across the terminals 2 and 3 and an output winding coupled across the discharge lamp 16 in order to initially ionize the gas therein.

OPERATION OF THE CIRCUIT

The source 1 provides the circuit with a suitable supply voltage. For example, the input line voltage may be a 400 Hz sine wave at 855 volts rms and 30–35 amperes rms. The LC circuit 10 is chosen to have a resonant frequency higher than the input line frequency, preventing a condition of passing through resonance during turn-on or turn-off of the SCRs 21 and 22. The input LC circuit 10 supplies an input voltage for the modulator circuit 20 at terminals 4 and 5.

The modulation circuit 20 provides two modes of operation. In the first mode a "keep-alive" current to the discharge lamp 16 is provided after the lamp 16 has initially been fired by the starting circuit 40 and when the SCRs 21 and 22 are not gated. This mode is illustrated in FIG. 2, in which the abscissa is time and the ordinate is voltage drop across the resistor 38. In the second mode, alternating current power is modulated into the load 14. In the present system, when the SCRs 21 and 22 are gated, the discharge lamp 16 will flash at a frequency of 800 Hz, i.e. one flash for each peak of the 400 Hz input sine wave voltage.

The modulation frequency provided by the modulation frequency source 30 is the envelope of the 800 Hz. light pulses. This mode is illustrated in FIG. 3, in which the abscissa is time and the ordinate is voltage. The light-line waveform is the output of the modulator 20, and the heavy-line waveform, not to the same scale as the light-line waveform, is the output of the modulation frequency source 30. It should be noted that in FIGS. 2 and 3, as well as FIG. 4, which illustrates radiant output of the lamp 16, only a fraction of the number of pulses produced are illustrated, for simplicity in the drawing.

When the SCRs 21 and 22 are in the off-state, keep-alive current flows through the detuned LC circuit 35 through the discharge lamp 16. The keep-alive current is sufficient to maintain ionization of the gas within the discharge tube 16 in order to eliminate restarting of the discharge lamp 16 at the beginning of each pulse. Maintenance of the keep-alive current through the discharge lamp 16 eliminates jitter, i.e. uncertainty in the point in time in which the discharge lamp 16 fires, that would arise were it necessary to restart the discharge lamp 16 before each light pulse. During keep-alive condition of the lamp 16, its radiant output is negligible compared to the full power condition. The ratio of keep-alive radiation to full power radiation is a measure of modulation depth for the discharge lamp 16. The portion of the keep-alive current going through the saturable reactor 36 is its self-magnetizing current. This current is substantially constant except when the input voltage approaches the zero crossing and the polarity of magnetization changes. The value of the inductance of the saturable reactor 36 varies as the instantaneous source voltage varies. This operation forms part of the present invention in its application to facilitate commutation of the SCRs 21 and 22.

In order to fire the discharge lamp 16, the SCRs 21 and 22 must be successfully gated. For the first half cycle of an input voltage waveform during which an output light pulse is to be produced, one of the SCRs 21 or 22 is gated, preferably at a zero source voltage crossing. To produce a light flash during a successive half cycle, the conducting SCR must turn off (the turn-off mechanism being back-biasing by the source voltage) and the other SCR is gated to turn on. In order to ensure proper commutation of the SCRs 21 and 22, the current through and the voltage across them should be substantially in phase when the switching means 19 is gated, lest one of them not turn off. The values of components of the parallel LC circuit 35 are chosen to provide the desired phase relationship of current and voltage applied to the switching means 19 at a particular time interval, e.g. the input waveform zero-voltage crossover. The values of the components of the LC circuit 35 are chosen according to well-known resonant circuit theory such that the LC circuit 35 is resonant at the frequency of the input waveform and such that the impedance of the LC circuit 35 provides a desired current to the load 14. This arrangement allows modulation of large values of alternating current power into the load 14.

Since the reactor 36 is saturable, its value goes through a cycle of tuned values as the voltage of the input waveform varies. The value of the reactor 36 is chosen such that it forms a resonant circuit when the input waveform is near the zero-voltage crossing. The resistor 38 dampens the LC circuit 35 to allow for resonant response to a range of input frequency. The dampening of the LC circuit 35 is such that phase differences between current and voltage remain within allowable tolerances.

Gating of the SCRs 21 and 22 is accomplished as follows. Zero crossover of the source input voltage waveform is sensed by the lines 24 and 25 of the zero-voltage crossover switch 23, which provides gating signals alternately to the SCRs 21 and 22 at each input waveform zero-voltage crossover when enabled by the modulation frequency source 30. It should be noted that where $dv/dt$ across the load 14 does not present a danger of damage, the zero-voltage crossover switch 23 may be replaced by any convenient gating means, e.g. a well-known RC phase-shift network, for switching at any desired time of the input waveform. The modulation frequency source 30 enables the provision of gating signals when its output is one of polarity, e.g. positive, as illustrated in FIG. 3. The frequency selected for the output of the modulation frequency source 30, e.g. 10–15 Hz is the modulation frequency of the modulator circuit 20. The degree of asymmetry of the output waveform of the modulation frequency source 30, i.e. the percentage of each cycle during which its output is positive, e.g. 10–40 percent, comprises the duty cycle of the modulator circuit 20.

Once an SCR 21 and 22 is fired, the lamp 16 fires in the following manner. At the beginning of a half cycle, the capacitor 12 begins charging, and the potential of which the capacitor 12 is charged is connected across the load reactor 15 and lamp 16. Volt seconds accumulate in the core of the reactor 15. The load reactor 15 is chosen to have a value such that it saturates some time shortly after the potential across the capacitor 12 reaches its peak. When the saturable reactor 15 saturates, the capacitor 12 discharges through the lamp 16 and a flash is produced. The output of the discharge lamp 16 is illustrated in FIG. 4, in which the abscissa is time and the ordinate is radiant energy.

The source energy available at peak voltage is supplied to the lamp, except for small losses in SCRs 21 and 22 and the load reactor 15. It is noted that the voltage across the capacitor 12 cannot decay faster than the source voltage. Therefore, reactive power is the main power component into the discharge lamp 16. The only real power is that which is dissipated by the discharge lamp 16 and losses in the above-mentioned components. Thus the reactive and real component make-up the total lamp power. The value of the capacitor 12 is important in relation to the input frequency time period and the current discharge through the discharge lamp 16.

As well as controlling the phase relationship of voltage and current at a particular time interval, i.e. the zero-voltage crossover, in order to allow for modulation of large values of alternating current power into a low power factor load, the modulator circuit 20 performs other functions. It protects the SCRs 21 and 22. The $dv/dt$ across the SCRs 21 and 22 is controlled by the series connected RC combination of the resistor 38 and capacitor 37 upon turn off of an SCR. The paralleling of the RC combination 37 and 38 with the inductive reactor 36 provides an attenuator in series with the load reactor 15 and the discharge lamp 16 during the keep-alive condition.

It should be noted that while the reactor 36 is preferably a near square loop saturating inductor, it is not intended to be used in the saturated state. Its inductance varies as a function of its fixed parameters and the current through it, and is equivalent to the relation $L=(A_{Fe}/l_{Fe}) N^2 \mu$ where $A_{Fe}$=cross-sectional area of its core, $l_{Fe}$ = means length of the inductor, $N$ = numbers of turns, and $\mu$ = average core permeability. The value of the inductor is chosen so that its average inductance is at the absolute value at the "knee" of its hysteresis loop.

Analyzing the modulator circuit 20, in further detail it is desirable, though not necessary that SCRs 21 and 22 be of the amplifying gate type for the following reason. If the input line voltage from the source 1 is a higher than normal value, the load reactor 15 will be saturated for a longer period of time than were the input voltage from the source 1 at a normal value, and its inductance value will affect the phase relationship of voltage and current through the modulator circuit 20. When this condition occurs, the modulation becomes unreliable and the SCRs cannot turn off. The result will be that the discharge lamp 16 may heat up at a rapid rate due to its being on a longer period of time and damage may result. In addition, in the case of SCR turn on with high line voltage, producing ignition of the discharge lamp 16 into a very high conduction state, a very high $di/dt$ of current into the discharge lamp 16 may result and destroy the SCR 21 or 22 which is receiving the initial surge. This condition is possible due to the fact that the switching rise time of the load reactor 15 is much faster than the turn on time of the SCRs 21 and 22. The use of amplifying gate SCRs alleviates the above-described problems.

While the present invention has been demonstrated in the context of a discharge lamp circuit, it should be realized that it is suitable for use with any load into which it is desired to modulate alternating current power. The present invention provides for maintenance of a controllable phase difference between voltage and current applied to a gated, bilateral, switching means and allows for independent control of modulation of output power and duty cycles during which output power is provided.

It should be realized that changes in the specific details and circuitry may be made without departing from the present invention. For example, the saturable reactor 36 may be replaced by non-saturating reactor since the phase relationship of voltage and current can be any value during the time periods between the points at which the switching periods of the switching means 19 begin and end. The specification has been written with a view toward enabling those skilled in the art to make other changes consistent with the scope of the invention.

What is claimed as new and desired to be secured by Letters Patent of the United States is:

1. In an alternating current circuit for supplying power from an alternating current input waveform source and a resonant input circuit to a load and including, gated bilateral switching means for providing conduction paths in opposite directions in series between the source and the load, the improvements comprising: a parallel LC circuit connected across said switching means, said parallel LC circuit providing a predetermined phase relationship between the current and the voltage applied to said parallel LC circuit at a predetermined time of each half cycle of the input waveform, whereby said LC circuit forms a resonant circuit responsive to the alternating current input waveform and provides a current path therefor.

2. The improvement according to claim 1 in which the values of the components of said parallel LC circuit are chosen to provide a substantially zero phase difference between current and voltage applied to said switching means when the input voltage waveform is in the immediate vicinity of its zero-voltage crossover.

3. The improvement according to claim 2 wherein said parallel LC circuit includes a saturable reactor having a value such that it operates near the knee of its hysteris loop.

4. The improvement according to claim 3 wherein said parallel LC circuit includes a resistor connected in series with a capacitor for dampening said parallel LC circuit.

5. In an alternating current system for providing alternating current power from a resonant LC circuit supplied by an input source waveform to a non-linear load, a modulator circuit for connection between said input circuit and said load comprising: gated bilateral switching means coupled between the source and the load, and a parallel LC circuit connected across said switching means, said parallel LC circuit providing a substantially zero phase relationship between voltage and current applied to said switching means when said switching means is gated, whereby said LC circuit forms a resonant circuit responsive to the alternating current input waveform and provides a current path therefor.

6. The modulator circuit according to claim 5 in which said switching means comprises first and second oppositely poled, parallel connected amplifying gate silicon controlled rectifiers.

7. The modulator circuit according to claim 6 further comprising a zero-voltage crossover switch having first inputs coupled to be responsive to the source input waveform and for providing gating signals to said silicon controlled rectifiers, first and second outputs respectively coupled for selectively gating said first and second silicon controlled rectifiers, and a further input coupled to a source of modulation frequency, said source of modulation frequency being coupled to enable said zero voltage crossover switch to provide gating signals when the output of said source of modulation frequency is of a first polarity.

8. The modulator circuit according to claim 7 wherein said source of modulation frequency comprises an asymmetrical square wave generator having a selectable frequency and a selectable degree of asymmetry.

9. The modulator circuit according to claim 8 wherein said parallel LC circuit includes a saturable reactor.

10. The modulator circuit according to claim 9 in which said parallel LC circuit includes a resistor connected in series with said capacitor, said resistor dampening said parallel LC circuit and forming in combination with said capacitor an RC circuit for controlling $dv/dt$ across said silicon controlled rectifiers upon turn-off.

11. An alternating current system comprising in combination:
a. an input LC circuit for connection to a source of an alternating current voltage input waveform and having first and second terminals;
b. gated, bilateral switching means connected in series with a first terminal of said input LC circuit;
c. a parallel LC circuit connected across said gated bilateral switching means, said parallel LC circuit providing a substantially zero phase difference of voltage and current applied to said bidirectional switching means when said bidirectional switching means is gated and providing a current path when said bidirectional switching means is not gated; and
d. an alternating current load circuit connected in series between said parallel LC circuit and a second terminal of said input LC circuit.

12. The system according to claim 11 in which said gated, bilateral switching means comprises first and second silicon controlled rectifiers oppositely poled and connected in parallel relationship.

13. The system according to claim 12 further comprising a zero-voltage crossover switch having first and second output terminals respectively connected to the gates of said first and second silicon controlled rectifiers, first and second input terminals coupled for sensing the input voltage waveform, said circuit being for producing gating signals when the input voltage waveform crosses a zero-voltage level, and further input terminals for connection to a source of modulation frequency, said zero-voltage crossover switch including means for providing successive gating signals in succession to said first and said second silicon controlled rectifiers alternately when said circuit is enabled during the provision of a modulating input wave.

14. The system according to claim 13 further comprises a modulation frequency source being coupled to said zero-voltage crossover switch for enabling the provision of gating signals when the output of said modulation frequency source is of a first polarity, said modulation frequency source providing a selectable frequency and a selectable degree of asymmetry of modulation frequency waveform.

15. The system according to claim 14 in which said silicon controlled rectifiers comprise amplifying gate silicon controlled rectifiers.

16. The system according to claim 15 in which said load circuit comprises a saturable reactor connected in series with a discharge lamp.

17. The system according to claim 16 in which said parallel LC circuit includes a saturable reactor.

18. The system according to claim 17 in which said parallel LC circuit includes a capacitor connected in series with a resistor, said resistor dampening said parallel LC circuit.

* * * * *